United States Patent [19]

Tsuei et al.

[11] Patent Number: 5,449,399
[45] Date of Patent: Sep. 12, 1995

[54] BLENDABLE WRITING INSTRUMENT

[75] Inventors: Alexander C.-R. Tsuei, Woodbury; Daniel B. Pendergrass, Jr., Mendota Heights, both of Minn.

[73] Assignee: Minnesota Mining and Manufacturing Company, St. Paul, Minn.

[21] Appl. No.: 255,151

[22] Filed: Jun. 7, 1994

[51] Int. Cl.$^6$ ............... C09D 13/00; C09D 11/12
[52] U.S. Cl. .................. 106/19 B; 106/19 E; 106/31 R
[58] Field of Search ........... 106/19 B, 19 E, 31 R

[56] References Cited

U.S. PATENT DOCUMENTS

| | | | |
|---|---|---|---|
| 2,383,176 | 1/1944 | Goepfert | 106/19 B |
| 3,672,842 | 6/1972 | Florin | 106/19 B |
| 3,769,045 | 10/1973 | Maierson et al. | 106/19 |
| 4,058,644 | 11/1977 | DeVries et al. | 428/200 |
| 4,557,618 | 12/1985 | Iwata et al. | 401/34 |
| 4,610,927 | 9/1986 | Igarashi et al. | 428/402.21 |
| 4,756,906 | 7/1988 | Sweeny | 424/63 |
| 4,762,493 | 8/1988 | Anderson | 434/84 |
| 4,879,174 | 11/1989 | Marabella | 428/321 |
| 5,039,243 | 8/1991 | O'Brien | 401/49 |
| 5,208,132 | 5/1993 | Kamada et al. | 430/138 |

*Primary Examiner*—Helene Klemansky
*Attorney, Agent, or Firm*—Gary L. Griswold; Walter N. Kirn; Dale A. Bjorkman

[57] ABSTRACT

Writing instruments are provided comprising a) a friction transferable binder comprising a colorant, and b) frangible microcapsules containing a liquid solvent. The writing instrument contains sufficient microcapsules to provide a Coloration Uniformity Percentage (defined herein) of at least about 25%.

21 Claims, No Drawings

BLENDABLE WRITING INSTRUMENT

FIELD OF THE INVENTION

The present invention relates to writing instruments. More specifically, this invention relates to writing instruments such as crayons that are blendable upon rubbing the mark made by the writing instrument.

BACKGROUND

Wax crayons have long been used by children (and others) for drawing and generally as writing instruments. Over the years, many different types of pigments have been incorporated into a wax base to generate a complete array of available colors. Such wax crayons have had limited application for serious artistic expressions, because on the one hand, the line created by a crayon is not very precise, and on the other hand, the pigmented wax does not readily lend itself to blending of the colors. In order to achieve blendability, artists have been forced to switch to a different medium such as pastels, paints, and the like.

U.S. Pat. No. 3,769,045 discloses a process for producing a liquid-write crayon. This crayon is designed to have a low wax content so that the crayon approaches the desirable fluid marking properties of felt-tip markers. To achieve this goal, the crayon contains 20 to 40 weight percent wax and 60 to 80 weight percent encapsulated marking liquid. The marking liquid contained within the microcapsules is disclosed to be any liquid dye or ink, but if desired may be colorless, but colorable. An example of a colorless but colorable marking liquid is the class of acidic mark-forming materials commonly used in the carbonless paper industry. The ink or dye contained in the microcapsules may optionally be dissolved in a liquid oil of a viscosity to act as an ink vehicle.

U.S. Pat. No. 5,039,243 to O'Brien discloses crayons that are provided with microcapsules containing fragrant materials within the shell of the microcapsules. Applying the crayon to a surface as in coloring a picture ruptures some of the microcapsules and releases a fragrance. The microcapsules may constitute between 1 and 60 percent of the weight of the crayons.

SUMMARY OF THE INVENTION

Writing instruments are provided comprising a) a friction transferable binder comprising a colorant, and b) frangible microcapsules containing a liquid solvent. The friction transferable binder is softenable by the liquid solvent under conditions of use. The microcapsules comprise between 2 and 55 percent by weight of the total weight of the binder, colorant and microcapsules, and the writing instrument contains sufficient microcapsules to provide a Coloration Uniformity Percentage of at least about 25%.

DETAILED DESCRIPTION

The uniformity of coloration by a writing instrument is evaluated by measuring the color obtained by uniformly and systematically covering a paper substrate with marks from a writing instrument, and comparing a sample so prepared with a like sample where the paper substrate is maintained at a temperature above the melting temperature of the writing instrument. The melted sample approximates a theoretical maximum blendability of the writing instrument, and therefore will give the best coloration that that writing instrument can deliver under the same marking pressure and frequency. The ratio of the color obtained through routine marking as compared to the color obtained under melt conditions establishes a Coloration Uniformity Percentage as defined through a specific protocol set forth below. It has surprisingly been found that the incorporation of microcapsules having liquid solvent that softens or solubilizes the friction transferable binder under conditions of use in an amount sufficient to provide a Coloration Uniformity Percentage of at least about 25% provides exceptional benefit in color uniformity, blendability and enhanced aesthetics of writing. More preferably, the writing instrument contains sufficient microcapsules to provide a Coloration Uniformity Percentage of at least about 35%, and more preferably at least about 45%.

By incorporating a microencapsulated liquid solvent in a friction transferable binder, the crayon may be rendered blendable. When a mark is placed on paper by the crayon, the frangible microcapsules rupture, thereby releasing the liquid solvent. While not being bound by theory, it is believed that this solvent solvates or softens the friction transferable binder and allows partial or total flow of the colorant-containing binder on the paper. Marks that are made with this writing instrument may be blended or smeared using the finger or a stylus. Preferably, the volatility of the solvent may be selected to provide a pre-determined time frame for blendability of the marks made by the writing instrument of the present invention. Thus, when a highly volatile solvent is incorporated in the microcapsules, the writing instrument of the present invention has a relatively short time duration for blendability. When a longer time duration for blendability is desired, a solvent is selected having a comparitively lower volatility whereby the solvent remains available on the substrate for time sufficient before evaporation to allow blendability during the desired time frame. In the case of solvents selected for short term blendablity of the binder material, preferably no more than 20% by weight of the solvent contained in the ruptured microcapsules is present on the marked substrate after 10 minutes. For solvents selected to achieve longer term blendability of the binder material, preferably at least 20% by weight of the solvent contained in the ruptured microcapsules is present on the marked substrate after two weeks.

Because the solvent is encapsulated, the writing instrument may be provided in a comparatively hard or firm state, and does not suffer from the mushiness or weakness of a like crayon having the same amount of solvent incorporated in the binder matrix in an unencapsulated state. Additionally, the writing implement of the present invention may be provided as a shelf-stable article. The solvent does not prematurely escape the binder matrix through leaching or volatilization because it is microencapsulated. Further, the properties of both the binder and the solvent may be now selected such that a blendable crayon is provided that does not melt during storage, even in temperatures as high as 120 degrees F., or more preferably 150 degrees F. Writing instruments having encapsulated solvent provide superior blending as compared to like instruments containing the same amount of solvent that is merely dispersed thoughout the crayon.

Writing instruments of the present invention further provide wax-based instruments having extremely desirable aesthetics of writing. Thus, a crayon can now be provided having a low drag coefficient during the creation of a mark on the paper. While not being bound by theory, it is believed that the solvent that is released during rupture of the microcapsules as the mark is being made acts to modify the surface energy and flow characteristices of the friction transferable binder, thereby reducing drag as compared to a like binder formulation not having solvent incorporated therein.

The friction transferable binder is selected from thermoplastic materials that will abrade upon rubbing with pressure onto a paper substrate, thereby leaving material on the substrate to produce an observable mark. Preferably, the friction transferable binder is selected from synthetic and natural waxes and blends thereof. Specific examples of appropriate waxes include carnauba, montan, and beeswax, long-chain paraffins, high molecular weight acids, high molecular weight alcohols, polyesters, polyethers, saturated high molecular weight hydrocarbons, hydrogenated fatty acids, branched chain hydrocarbon waxes and the like. Preferred friction transferable binder materials include thermoplastic materials that are solid at 100 degrees F. More preferably, the friction transferable binder is solid at 120 degrees F., and more preferably at 150 degrees F. Particularly preferred binders are $C_{18-32}$ esters of benzoic acid, paraffin, stearic acid and blends thereof. Especially preferred binders include stearyl benzoate and behenyl benzoate.

Optionally, the binder may be selected having shear yield strength such that it delivers a quantity of unbroken microcapsules to the substrate upon application of a mark to the paper. These capsules may later be broken by application of pressure to the marked area using the finger, a stylus, or other appropriate means, to release the solvent and impart blendablility to the mark.

The friction transferable binder material may optionally comprise additives such as solvents, thickeners, coating or extrusion aids, fillers, and the like.

The friction transferable binder contains a colorant, which may be selected from pigments, dyes, lakes, color-formers and the like or combinations of these colorants. Particularly preferred colorants are non-toxic colorants suitable for incorporation into writing instruments to be used by children. An optional colorant to be incorporated into writing instruments of the present invention include color-imparting materials that do not image until reacted with a developer, such as in the leuco dye chemistry or other such chemistry utilized in the carbonless paper industry.

The solvent is selected from materials that soften or solubilize the friction transferable binder within the time scale of intended use. The solvent preferably will soften the binder enough to enable blending or smearing of the binder immediately upon marking of the substrate with the writing instrument. Alternatively, the solvent may be selected to gradually soften the binder so that the blending or smearing effect is delayed for a predetermined time. Preferably, the solvent is selected from the group consisting of hydrocarbons, petroleum distillates, natural or synthetic oils, alcohols, esters, ethers, fatty esters, mineral spirits, and fatty alcohol esters of benzoic acid. Particularly preferred solvents are blends of $C_{16-18}$ esters of benzoic acid, butyl stearate, methyl laurate, isopropyl myristate and oleyl alcohol. Optionally, the solvent may also comprise a surfactant. Preferably, the surfactant may comprise between about 0.01 to 0.5% of the liquid fill by weight. While not being bound by theory, the surfactant appears to assist in distributing the solvent across the surface of the binder, thereby facilitating the softening action of the solvent.

Optionally, the microcapsules may additionally contain a coloring agent, such as dye, pigment, lake, color former and the like.

In accordance with the present invention, microcapsules containing solvent may be prepared by in situ processes such as aminoplast polymerization. The techniques disclosed, generally referred to as an in situ polymerization reaction, yield for example, an aminoplast resin capsule wall material. In the process, a hydrophobic oil phase is dispersed in an aqueous phase containing the aminoplast resin precursors by applying high shear agitation. Addition of an acid catalyst initiates the polycondensation of the aminoplast precursors, resulting in the deposition of the aminoplast resin about the dispersed droplets of the oil phase, producing the microcapsules.

The hydrophobic inner phase for the capsule may be any in situ aminoplast encapsulatable composition as discussed in U.S. Pat. No. 3,516,941, provided that the inner phase meets the criteria for acting as a solvent to the binder.

When the microcapsule is prepared by interfacial polycondensation, the capsule skin may be composed of any condensation polymer or addition polymer, e.g., polyamide, polyurethane, polysulfonamide, polyurea, polyester, polycarbonate, etc. Polyamides prepared by interfacial polycondensation of an amine with an acid chloride or polymers formed by reaction of isocyanate prepolymer with polyamines are preferred.

Microcapsules formed by coacervation processes are also useful in forming microcapsule shells according to the present invention. Coacervation is the well known process of forming higher molecular weight gelatin polymers as taught in U.S. Pat. Nos. 2,800,458 and 2,800,457.

The capsules used in these constructions and generally in the practice of the present invention have average diameters between about 4 and 200 microns. Preferably the average diameters are between about 40 and 150 microns, and more preferably, between about 80-120 microns. The capsules preferably constitute from 2 to 55% by weight of the composition, and most preferably between 5 and 40% by weight of the composition. Larger capsules deliver much more volume of solvent per capsule, and therefore are preferred for the present invention.

Coloration Uniformity Percentage

As noted above, Coloration Uniformity Percentage is the ratio of measured color of a sample mark made by a writing instrument as compared to a mark made by the same writing instrument made on paper heated to a temperature above the melting temperature of the binder. This evaluation is made experimentally as follows:

Samples are prepared by applying marks using a writing instrument having an 8 mm diameter sharpened to about a 2.5 mm point with pressure of about 800 g to a standard paper substrate. A preferred standard paper substrate is 20 pound white bond paper. Forty evenly spaced substantially parallel traverses of the writing instrument are made to create a 4 cm by 4 cm sample testing area. This number of marks in this space necessitates some overlap of marks in preparation of the sample area. Such overlap may provide an opportunity for blending of the marks made by the writing instrument through friction of the instrument over the previously made mark. The degree of color uniformity is evaluated by measuring the color imparted to the above marked samples on a Hunter colorimeter or other similar color measuring device.

Paper with a sample mark prepared as described above is placed over the sample aperture of the color measuring instrument such that the sample completely overlaps the aperture. A white tile is then placed in position to back the sample and CIELAB data is obtained from the colorimeter, using an average of three readings per sample. The color difference ($\Delta E^*ab$) of each test sample was calculated according to the following equation:

$$\Delta E^*ab = \sqrt{[(\Delta L^*)^2 + (\Delta a^*)^2 + (\Delta b^*)^2]}$$

where delta E*ab represents the difference in color between the control paper and the marked paper, and delta L*, delta a*, and delta b* terms are the color coordinates. The delta L, term represents the lightness of the color, the delta a* term represents the redness or greenness of the color, and the delta b* term represents the yellowness or blueness of the color. For a further discussion see "Principles of Color Technology", second Ed., F. W. Billmeyer and M. Saltzmann, pages 59 through 60 and 102 through 104.

The Color Uniformity Percentage is determined by comparing the $\Delta E^*ab$ of writing instrument marks made by the experimental prodecure ($\Delta E^*ab_{mark}$) with the $\Delta E^*ab$ of a theoretical maximum color that may be imparted by a writing instrument of same binder constitution where the sample was prepared by writing with the same pressure on a heated piece of paper to achieve melting of the binder onto the paper ($\Delta E^*ab_{melt}$). The paper is heated by carrying out the marking protocol on paper located on a hot plate set at a temperature above the melting temperature of the binder, so that the binder melts during the marking process.

Thus,

Color Uniformity Percentage = $\Delta E^*ab_{mark} / \Delta E^*ab_{melt} \times 100$.

The writing instruments of the present invention are useful for writing on hard substrates, primarily paper and the like. Alternatively, the writing instruments may be used to write on alternative appropriate substrates, such as plastic, wood, painted surfaces, cardboard, pressboards, canvas, fabrics and the like. Preferably, the surface of the substrate is slightly textured, on the order of the texture of bond paper. Excessive texture, such as the surface of concrete, is undesirable.

The following examples are provided for purposes of illustrating the invention, and are not to be considered to be limiting the scope thereof. Unless otherwise indicated, all ratios and percentages are by weight.

EXAMPLE 1

1 gram of phthalo blue pigment, having about 2 micron mean diameter, was dispersed in 12 grams of Finsolv® 116 wax (a fatty benzoate ester commercially available from FINETEX, Inc., Elmwood Park, N.J.) at 110° C., to which was then added 7 grams of 100 μm capsules comprising polymethoxyurea (PMU) shell material and containing 80 weight % Finsolv® TN solvent (a mixture of the benzoate esters of linear $C_{12-15}$ primary alcohols commercially available from FINETEX, Inc., Elmwood Park, N.J.) fill. The resulting composition was transferred to 3 c.c. disposable syringes, and allowed to cool at room temperature or quenched in ice cold water

EXAMPLE 2

1 gram of Hansa yellow pigment, having about 2 micron mean diameter, was dispersed in 12 grams of Finsolve® 116 wax at 110° C., to which was then added 7 grams of 100 μm capsules comprising polymethoxyurea (PMU) shell material and containing 80 weight % Finsolve® TN solvent fill. The resulting composition was transferred to 3 c.c. disposable syringes, and allowed to cool at room temperature or quenched in ice cold water.

EXAMPLE 3

3 grams of Titanium white pigment, having about 2 micron mean diameter, were dispersed in 12 grams of Finsolve® 116 wax at 110° C., to which was then added 7 grams of 100 μm capsules comprising polymethoxyurea (PMU) shell material and containing 80 weight % Finsolve® TN solvent fill. The resulting composition was transferred to 3 c.c. disposable syringes, and allowed to cool at room temperature or quenched in ice cold water.

EXAMPLE 4

1 gram of Red c19011 pigment, having about 2 micron mean diameter was dispersed in 12 grams of Finsolve® 116 wax at 110° C., to which was then added 7 grams of 100 μm capsules comprising polymethoxyurea (PMU) shell material and containing 80 weight % Finsolve® TN solvent fill. The resulting composition was transferred to 3 c.c. disposable syringes, and allowed to cool at room temperature or quenched in ice cold water.

EXAMPLE 5

4 grams of Red c19011 pigment, having about 2 micron mean diameter were dispersed in 20 grams of Finsolve® 116 wax at 110° C., to which was then added 4 grams of 100 μm capsules comprising polymethoxyurea (PMU) shell material containing 80 weight % Finsolve® TN solvent fill. The resulting composition was transferred to 3 c.c. disposable syringes, and allowed to cool at room temperature or quenched in ice cold water.

EXAMPLE 6

4 grams of Red c19011 pigment, having about 2 micron mean diameter were dispersed in 20 grams of Finsolve® 116 wax at 110° C., to which was then added 4 grams of 32 μm capsules comprising polymethoxyurea (PMU) shell material containing 80 weight % Finsolve® TN solvent fill. The resulting composition was transferred to 3 c.c. disposable syringes, and allowed to cool at room temperature or quenched in ice cold water.

EXAMPLE 7

4 grams of Red c19011 pigment, having about 2 micron mean diameter were dispersed in 20 grams of Finsolve® 116 wax at 110° C., to which was then added 4 grams of 180 μm capsules comprising polymethoxyurea (PMU) shell material and containing 80 weight % Finsolve® TN solvent fill. The resulting composition was transferred to 3 c.c. disposable syringes, and allowed to cool at room temperature or quenched in ice cold water.

EXAMPLE 8

2.4 grams of Red c19011 pigment, having about 2 micron mean diameter were dispersed in 12 grams of Finsolve® 116 wax at 110° C., to which was then added 7 grams of 100 μm capsules comprising polymethoxyurea (PMU) shell material and containing 80 weight % Finsolve® TN solvent fill. The resulting composition was transferred to 3 c.c. disposable syringes, and allowed to cool at room temperature.

EXAMPLE 9

1 grams of Red c19011 pigment, having about 2 micron mean diameter was dispersed in 9.6 grams of Finsolve® 116 wax and 2.4 grams of Finsolv® 137 at 110° C., to which was then added 6 grams of 32 μm capsules comprising polymethoxyurea (PMU) shell material containing 80 weight % Finsolve® TN solvent fill. The resulting composition was transferred to 3 c.c. disposable syringes, and allowed to cool at room temperature or quenched in ice cold water.

EXAMPLE 10

1 grams of Phthalo blue pigment, having about 2 micron was dispersed in 9.6 grams of Finsolve® 116 wax and 2.4 grams of Finsolv® 137 at 110° C., to which was then added 6 grams of 32 μm capsules comprising polymethoxyurea (PMU) shell material containing 80 weight % Finsolve® TN solvent fill. The resulting composition was transferred to 3 c.c. disposable syringes, and allowed to cool at room temperature or quenched in ice cold water.

EXAMPLE 11

1 grams of Hansa yellow pigment, having about 2 micron mean diameter was dispersed in 9.6 grams of Finsolve® 116 wax and 2.4 grams of Finsolv® 137 at 110° C., to which was then added 6 grams of 32 μm capsules comprising polymethoxyurea (PMU) shell material containing 80 weight % Finsolve® TN fill. The resulting composition was transferred to 3 c.c. disposable syringes, and allowed to cool at room temperature or quenched in ice cold water.

EXAMPLE 12

3 grams of Titanium white pigment, having about 2 micron mean diameter were dispersed in 9.6 grams of Finsolv® 116 wax and 2.4 grams of Finsolv® 137 at 110° C., to which was then added 6 grams of 32 μm capsules comprising polymethoxyurea (PMU) shell material containing 80 weight % Finsolv® TN fill. The resulting composition was transferred to 3 c.c. disposable syringes, and allowed to cool at room temperature or quenched in ice cold water.

EXAMPLE 13

3 grams of Red c19011 pigment, having about 2 micron mean diameter were dispersed in 30 grams of Finsolv® 116 wax at 110° C., then added 15 grams of 100 μm capsules comprising polymethoxyurea (PMU) shell material containing 80 weight % Finsolv® TN fill. The resulting composition was transferred to 3 c.c. disposable syringes, and allowed to cool at room temperature or quenched in ice cold water.

EXAMPLE 14

3 grams of Phthalo blue pigment, having about 2 micron mean diameter were dispersed in 30 grams of Finsolv® 116 wax at 110° C., to which was then added 15 grams of 100 μm capsules comprising polymethoxyurea (PMU) shell material containing 80 weight % Finsolv® TN fill. The resulting composition was transferred to 3 c.c. disposable syringes, and allowed to cool at room temperature or quenched in ice cold water.

EXAMPLE 15

3 grams of Hansa yellow pigment, having about 2 micron mean diameter were dispersed in 30 grams of Finsolv® 116 wax at 110° C., to which was then added 15 grams of 100 μm capsules comprising polymethoxyurea (PMU) shell material containing 80 weight % Finsolv® TN fill. The resulting composition was transferred to 3 c.c. disposable syringes, and allowed to cool at room temperature or quenched in ice cold water.

EXAMPLE 16

7 grams of Titanium white pigment, having about 2 micron mean diameter were dispersed in 30 grams of Finsolv® 116 wax at 110° C., to which was then added 15 grams of 100 μm capsules comprising polymethoxyurea(PMU) shell material containing 80 weight % butyl acetate fill. The resulting composition was transferred to 3 c.c. disposable syringes, and allowed to cool at room temperature or quenched in ice cold water.

EXAMPLE 17

1 gram of Red c 19011 pigment, average having about 2 micron mean diameter was dispersed in 12 grams of Finsolv® 116 wax at 110° C., to which was then added 6 grams of 100 μm capsules comprising polymethoxyurea (PMU) shell material containing 80 weight % Finsolv® TN fill. The resulting composition was transferred to 3 c.c. disposable syringes, and allowed to cool at room temperature.

EXAMPLE 18

1 gram of Red c 19011 pigment, having about 2 micron mean diameter was dispersed in 12 grams of Finsolv® 116 wax at 110° C., to which was then added 6 grams of 100 μm capsules comprising polymethoxyurea (PMU) shell material containing 80 weight % butyl acetate fill. The resulting composition was transferred to 3 c.c. disposable syringes, and allowed to cool at room temperature or quenched in ice cold water.

EXAMPLE 19

1 gram of Phthalo blue pigment, having about 2 micron mean diameter was dispersed in 12 grams of Finsolv® 116 wax at 110° C., to which was then added 6 grams of 100 μm capsules comprising polymethoxyurea (PMU) shell material containing 80 weight % texanol isobutylate (from Aldrich chem. Co.) fill. The resulting composition was transferred to 3 c.c. disposable syringes, and allowed to cool at room temperature or quenched in ice cold water.

EXAMPLE 20

1 gram of Pergascript black (from Ciba Geigy) and 2 grams of titanium white, average having about 2 micron mean diameter were dispersed in 12 grams of Finsolv® 116 wax at 110° C., to which was then added 5 grams of 100 μm capsules comprising polymethoxyurea (PMU)

shell material containing 80 weight % Finsolv® TN fill. The resulting composition was transferred to 3 c.c. disposable syringes, and allowed to cool at room temperature or quenched in ice cold water.

EXAMPLE 21

1 gram of Pergascript green and 2 grams of titanium white, average having about 2 micron mean diameter were dispersed in 12 grams of Finsolv® 116 wax at 110° C., to which was then added 5 grams of 100 μm capsules comprising polymethoxyurea (PMU) shell material containing 80 weight % Finsolv® TN fill. The resulting composition was transferred to 3 c.c. disposable syringes, and allowed to cool at room temperature or quenched in ice cold water.

EXAMPLE 22

1 gram of Pergascript yellow and 2 grams of titanium white, having about 2 micron mean diameter were dispersed in 12 grams of titanium white, 2 microns, were dispersed in 12 grams of Finsolv® 116 wax at 110° C., to which was then added 5 grams of 100 μm capsules comprising polymethoxyurea (PMU) shell material containing 80 weight % Finsolv® TN fill. The resulting solution was transferred to 3 c.c. disposable syringes, and allowed to cool at room temperature or quenched in ice cold water.

EXAMPLE 23

1 gram of Pergascript red and 2 grams of titanium white, having about 2 micron mean diameter were dispersed in 12 grams of Finsolv® 116 wax at 110° C., to which was then added 5 grams of 100 μm capsules comprising polymethoxyurea (PMU) shell material containing 80 weight % Finsolv® TN fill. The resulting composition was transferred to 3 c.c. disposable syringes, and allowed to cool at room temperature or quenched in ice cold water.

EXAMPLE 24

1 gram of Pergascript orange and 2 grams of titanium white, having about 2 micron mean diameter were dispersed in 12 grams of Finsolv® 116 wax at 110° C., to which was then added 5 grams of 100 μm capsules comprising polymethoxyurea (PMU) shell material containing 80 weight % Finsolv® TN fill. The resulting composition was transferred to 3 c.c. disposable syringes, and allowed to cool at room temperature or quenched in ice cold water.

EXAMPLE 25

0.4 gram of Red c 19011 pigment, having about 2 micron mean diameter was dispersed in 8 grams of Crayon wax base at 110° C., to which was then added 12 grams of 100 μm capsules comprising polymethoxyurea (PMU) shell material containing 80 weight % Texanol isobutylate (from Aldrich Chem. Co.) fill. The resulting composition was transferred to 50 c.c. disposable container, and allowed to cool at room temperature.

EXAMPLE 26

To compare the effect of microencapsulated solvent on the coverage attainable by the blending action of slightly overlapping strokes, crayons were prepared as follows: a) crayons with no additive, b) crayons with 2.5% free butyl stearate, c) crayons containing 2.5% 35 micron diameter microencapsulated butyl stearate, and d) crayons containing 2.5% 120 micron diameter microencapsulated butyl stearate. The microcapsules contained about 76.6 weight % butyl stearate. The crayon with no additive was used to prepare scribble patches representative of the range of fractional coverage attainable by varying the pressure used and by scribbling a second time at right angles to the first set of marks (crosshatch). These scribble patches were prepared by hand to simulate the range of coloring pressures and overlap commonly found in ordinary use. In addition, scribble patches were prepared with normal and heavy pressures on a heated piece of paper to represent the maximum mark intensities which could be attained with complete thin and thick coverage respectively. Similar scribble patches were prepared mechanically (40 lines, 4 cm×4 cm as described above) using the crayons containing either free or microencapsulated butyl stearate using normal pressure. The crayon containing free solvent was difficult to use because the solvent weakened the tip causing it to break off easily. Even though the crayons containing the microencapsulated solvent contained less total solvent than other crayons evaluated with solvent dispersed in the binder, they gave consistently better coverage.

| Description | ΔE | % Melted Heavy | % Melted Normal |
| --- | --- | --- | --- |
| Normal Pressure | 18.9 | 19.8 | 22.8 |
| Crosshatch Normal Pressure | 32.8 | 34.7 | 39.9 |
| Heavy Pressure | 51.2 | 54.1 | 62.2 |
| Melted Normal Pressure | 82.28 | 87.0 | 100.0 |
| Melted Heavy Pressure | 94.59 | 100.0 | 115.0 |
| Normal (+2.5% butyl stearate)[1] | 17.1 | 18.1 | 20.8 |
| Normal (+2.5% small capsules)[2] | 24.6 | 26.0 | 30.0 |
| Normal (+2.5% large capsules)[3] | 37.2 | 39.3 | 45.2 |

[1]Crayon with 2.5% free butyl stearate. Difficult to use due to tip breakage.
[2]Crayon contains 2.5% 35 micron dia. capsules (~1.92% butyl stearate).
[3]Crayon contains 2.5% 120 micron dia. capsules (~1.92% butyl stearate).

This example demonstrates that even with very low amounts of solvent provided in the microcapsules, the difference in color measured (ΔE) is dramatically improved as compared to like formulated crayons not having microcapsules.

What is claimed:

1. A writing instrument comprising
   a) a friction transferable binder comprising a colorant, and
   b) frangible microcapsules containing a liquid solvent therein, said friction transferable binder being softenable by said liquid solvent under conditions of use, wherein said microcapsules comprise between 2 and 55 percent by weight of the total weight of the binder, colorant and microcapsules, and wherein said writing instrument contains sufficient microcapsules to provide a Coloration Uniformity Percentage of at least 25%.

2. The writing instrument of claim 1, wherein said writing instrument contains sufficient microcapsules to provide a Coloration Uniformity Percentage of at least 35%.

3. The writing instrument of claim 1, wherein said writing instrument contains sufficient microcapsules to provide a Coloration Uniformity Percentage of at least 45%.

4. The writing instrument of claim 1, wherein the liquid solvent is selected from the group consisting of hydrocarbons, petroleum distillates, natural or synthetic oils, alcohols, esters, ethers, fatty esters, mineral spirits, and fatty alcohol esters of benzoic acid, and mixtures thereof.

5. The writing instrument of claim 1, wherein the liquid solvent is selected from the group consisting of butyl stearate, methyl laurate, isopropyl myristate, oleyl alcohol and blends of $C_{16-18}$ esters of benzoic acid and mixtures thereof.

6. The writing instrument of claim 1, wherein the liquid solvent further comprises a surfactant.

7. The writing instrument of claim 6, wherein the surfactant comprises between about 0.01 to 0.5% of the liquid fill by weight.

8. The writing instrument of claim 1, wherein the liquid solvent has a volatility selected such that, when the writing instrument is marked on a substrate, no more than 20% by weight of the solvent contained in the ruptured microcapsules is present on the marked substrate after 10 minutes.

9. The writing instrument of claim 1, wherein the liquid solvent has a volatility selected such that, when the writing instrument is marked on a substrate, at least 20% by weight of the solvent contained in the ruptured microcapsules is present on the marked substrate after two weeks.

10. The writing instrument of claim 1, wherein said friction transferable binder is selected from the group consisting of carnauba wax, montan wax, beeswax, longchain paraffins, high molecular weight acids, high molecular weight alcohols, polyesters, polyethers, saturated high molecular weight hydrocarbons, hydrogenated fatty acids and branched chain hydrocarbon waxes.

11. The writing instrument of claim 1, wherein said friction transferable binder is selected from the group consisting of thermoplastic materials that are solid at 100 degrees F.

12. The writing instrument of claim 1, wherein said friction transferable binder is selected from the group consisting of thermoplastic materials that are solid at 120 degrees F.

13. The writing instrument of claim 1, wherein said friction transferable binder is selected from the group consisting of thermoplastic materials that are solid at 150 degrees F.

14. The writing instrument of claim 1, wherein said friction transferable binder is selected from the group consisting of $C_{18-32}$ esters of benzoic acid, paraffin, stearic acid and blends thereof.

15. The writing instrument of claim 1, wherein said friction transferable binder is selected from the group consisting of stearyl benzoate and behenyl benzoate.

16. The writing instrument of claim 1, wherein said friction transferable binder is selected from materials having shear yield strength such that the writing instrument delivers a quantity of unbroken microcapsules to the substrate upon application of a mark to paper.

17. The writing instrument of claim 1, wherein said friction transferable binder comprises paraffin and said solvent comprises petroleum distillates.

18. The writing instrument of claim 1, wherein said friction transferable binder comprises stearic acid and said solvent comprises butyl stearate.

19. The writing instrument of claim 1, wherein said friction transferable binder comprises $C_{18-32}$ esters of benzoic acid and said solvent comprises blends of $C_{16-18}$ esters of benzoic acid.

20. The writing instrument of claim 1, wherein said microcapsules have average diameters between about 40 and 150 microns.

21. The writing instrument of claim 1, wherein said microcapsules have average diameters between about 80 and 120 microns.

* * * * *